United States Patent
Gallagher

(10) Patent No.: US 9,829,125 B2
(45) Date of Patent: Nov. 28, 2017

(54) FLEXIBLE HIGH-PRESSURE PIPE STRUCTURE

(71) Applicant: James L. Gallagher, Inc., Little Compton, RI (US)

(72) Inventor: James L. Gallagher, Little Compton, RI (US)

(73) Assignee: James L. Gallagher, Inc., Little Compton, RI (US)

( * ) Notice: Subject to any disclaimer, the term of this patent is extended or adjusted under 35 U.S.C. 154(b) by 399 days.

(21) Appl. No.: 14/270,612

(22) Filed: May 6, 2014

(65) Prior Publication Data

US 2014/0332110 A1 Nov. 13, 2014

Related U.S. Application Data

(60) Provisional application No. 61/820,333, filed on May 7, 2013.

(51) Int. Cl.
*F16L 11/08* (2006.01)
*F16L 11/18* (2006.01)

(52) U.S. Cl.
CPC .............. *F16L 11/08* (2013.01); *F16L 11/18* (2013.01); *Y10T 29/49879* (2015.01)

(58) Field of Classification Search
USPC .................................. 138/120, 125, 129, 155
See application file for complete search history.

(56) References Cited

U.S. PATENT DOCUMENTS

| | | | |
|---|---|---|---|
| 376,401 A | 1/1888 | Wilder et al. | |
| 3,929,164 A * | 12/1975 | Richter | F16L 11/121 138/103 |
| 3,974,009 A * | 8/1976 | Butzow | F16C 23/045 156/161 |
| 4,147,381 A * | 4/1979 | Schwarz | F16L 25/03 138/109 |
| 4,739,801 A * | 4/1988 | Kimura | F16G 13/10 138/120 |
| 4,972,048 A * | 11/1990 | Martin | H02G 3/0475 138/120 |
| 5,197,767 A * | 3/1993 | Kimura | F16G 13/10 138/120 |
| 5,215,338 A * | 6/1993 | Kimura | F16L 3/015 138/120 |

(Continued)

FOREIGN PATENT DOCUMENTS

| | | |
|---|---|---|
| JP | 11030365 A | 2/1999 |
| JP | 2008281130 A | 11/2008 |
| WO | 2014000816 A1 | 1/2014 |

OTHER PUBLICATIONS

International Search Report and Written Opinion of the International Searching Authority dated Aug. 29, 2014, PCT Application No. PCT/US2014/036922 filed May 6, 2014, 10 pages.

*Primary Examiner* — James Hook
(74) *Attorney, Agent, or Firm* — BainwoodHuang

(57) ABSTRACT

A pipe structure includes a carcass made from an arrangement of hoop segments that join to form a series of articulating joints. A hard yet flexible outer shell is formed around the carcass. The hoop segments are reinforced with fiber to increase strength and reduce weight. The shell anchors to the carcass at intervals along its length to hold the hoop segments together, while providing the flexibility needed for deep water and other high pressure pipe applications.

21 Claims, 5 Drawing Sheets

(56) References Cited

U.S. PATENT DOCUMENTS

| | | | | |
|---|---|---|---|---|
| 5,778,939 A * | 7/1998 | Hok-Yin | ............... | A47L 9/24 |
| | | | | 138/109 |
| 6,408,888 B1 * | 6/2002 | Baumer | ............... | F16G 13/16 |
| | | | | 138/120 |
| 2009/0308478 A1 | 12/2009 | Vo | | |
| 2012/0273081 A1 | 11/2012 | Graham et al. | | |

* cited by examiner

FLEXIBLE HIGH-PRESSURE PIPE STRUCTURE

This application claims priority to U.S. Provisional Application No. 61/820,333, filed May 7, 2013, the contents and teachings of which are hereby incorporated by reference in their entirety.

BACKGROUND

Recovering oil from undersea wells often involves the use of flexible pipes to connect a well on a sea floor to production equipment at the surface. Such pipes must be able to withstand enormous pressures arising from the weight of water at extreme depths and thus include strong internal structures that prevent water pressure from collapsing the pipes.

Suitable internal pipe structures are traditionally provided through the use of steel carcasses within the pipes. A conventional steel carcass is a continuous hoop made by forming steel strips into an interlocked structure that can flex, withstand external pressure, and withstand axial forces. For example, short steel hoop segments may be formed and longitudinally crimped together to form an extended tubular structure. Accordion-like portions within each segment allow bending of the overall carcass. The carcass is typically covered with a thermoplastic liner which acts as a barrier to fluid. In addition, typical pipe designs include many external layers. The carcass prevents collapse of the thermoplastic liner and external layers. Fluids, such as oil, are transmitted through the pipe inside the carcass.

SUMMARY

Unfortunately, conventional pipe carcasses for high-pressure applications can be extremely heavy. As the required operating depths of pipes increases, e.g., to support deeper ocean wells, so too does the weight of the pipe carcasses, causing pipes for deep water applications to become difficult to handle and transport. In addition, the steel from which the pipe carcasses are made tends to fatigue and corrode over time, prematurely limiting the lifespan of the pipes. What is desired is a strong, lighter-weight pipe structure that resists fatigue and corrosion without sacrificing flexibility.

In contrast with conventional, high-pressure pipe designs, an improved pipe structure is made from an arrangement of hoop segments that join to form a pipe carcass having a series of articulating joints. A hard yet flexible outer shell is formed around the pipe carcass. The shell anchors to the carcass at intervals along its length to hold the hoop segments together while providing the flexibility needed for deep water pipe applications. The hoop segments are reinforced with fiber, which promotes increased strength, decreased weight, and resistance to fatigue and corrosion.

In one example, the pipe carcass includes an alternating arrangement of first and second hoop segments. Each first hoop segment has a front and back annular surface having a concave curvature, and each second hoop segment has a front and back annular surface having a convex curvature. The first and second hoop segments are assembled in alternating fashion end-to-end such that the front surface of one engages the back surface of the other to form an articulating joint, which functions, substantially, as a spherical bearing, thereby providing flexibility to the overall carcass.

Hoop segments may be joined to form structures of any length. In various examples, structures are formed in fixed length sections (e.g., 12-15 m each) or are made to arbitrarily lengths.

In an example, an abrasion resistant inner sleeve is applied to the outside of a pipe carcass. The inner sleeve may be provided as a prefabricated, fixed length sleeve, or it may be formed in place (e.g., using one or more large braiders) to any arbitrary length. A liquid impermeable barrier, such as silicone tape, is applied to the outside of the inner sleeve, and an outer sleeve (e.g., a braid made of fiberglass) is applied over the liquid impermeable barrier. The outer sleeve is impregnated with resin, which provides some ability to flex when cured. The liquid impermeable barrier prevents the resin from seeping to the inner sleeve.

In an example, the hoop segments, or some subset of them, include a feature, such as a groove or a raised area, on their outer surfaces, for anchoring the outer sleeve to the carcass. For example, each first hoop segment has a groove running around the outer circumference of the segment at or near a midpoint of the segment. Before the resin on the outer sleeve has cured, a fiber (or set of fibers) is wrapped around the outer sleeve and concentrated in the region outside each groove (or some subset of them), such that the outer sleeve, the liquid impermeable barrier, and the inner sleeve are all pressed toward and into each respective groove. The resin is then allowed to cure in this condition, thereby forming a series of "nodes" where the outer shell is anchored to the carcass. Once cured, the outer sleeve forms a shell, which holds the annular hoop segments together and prevents them from axially separating. The flexibility of the cured resin allows the pipe structure to flex and the hoop segments to articulate relative to one another. Where the hoop segments have raised areas on their outer surfaces instead of grooves, fiber may be wrapped on one or both sides of the raised areas to anchor the outer sleeve to the carcass, with the resin allowed to cure as described above.

Prior to the resin curing, the outer sleeve, including the anchoring fiber(s), may be wrapped with heat shrinkable tape. The tape serves to hold the pipe assembly and the fiber(s) together in a stable arrangement as the resin cures. The tape also promotes the formation of a smooth outer surface. The heat-shrinkable tape may be removed after the resin has cured, or kept in place if desired. Additional layers may be applied as needed to accommodate the target application.

Certain embodiments are directed to a pipe structure for use in high-pressure environments. The pipe structure includes multiple hoop segments each reinforced with fiber. The hoop segments are arranged end-to-end to form a pipe carcass having an articulating joint between each pair of adjacent hoop segments. The pipe structure further includes a shell disposed around the pipe carcass and anchoring to the pipe carcass at intervals along its length.

Other embodiments are directed to a pipe structure for use in high-pressure environments. The pipe structure includes multiple first hoop segments, each of the first hoop segments including carbon fiber, having an annular shape, and having a concave spherical bearing surface at each end thereof. The pipe structure further includes multiple second hoop segments, each of the second hoop segments including carbon fiber, having an annular shape, and having a convex spherical bearing surface at each end thereof. The first hoop segments and the second hoop segments are arranged in an alternating pattern end-to-end to form a pipe carcass such that each of the first hoop segments forms a spherical bearing with each second hoop segment adjacent thereto.

The pipe structure further includes a shell disposed around the pipe carcass and anchored to the pipe carcass at intervals along its length.

Still other embodiments are directed to a method of manufacturing a pipe structure for use in high-pressure environments. The method includes arranging multiple hoop segments end-to-end to form a pipe carcass having an articulating joint between each pair of adjacent hoop segments. Each of the hoop segments is reinforced with fiber. The method further includes applying a shell around the pipe carcass and anchoring the shell to the pipe carcass at intervals along a length of the pipe carcass.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved pipe structure includes a pipe carcass made from an arrangement of hoop segments that join to form a series of articulating joints. A hard yet flexible shell is formed around the pipe carcass. The hoop segments are reinforced with fiber to promote increased strength and reduced weight. The shell is anchored to the carcass at intervals along its length to hold the hoop segments together while allowing the structure to flex.

Figure 1:
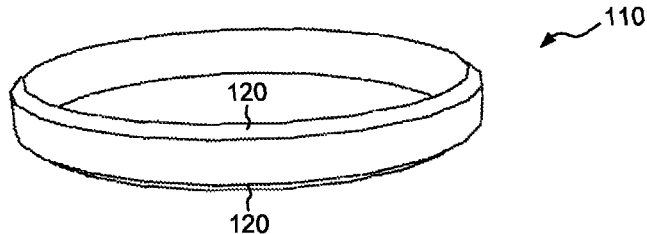
FIG. 1 is a perspective view of an example double-convex hoop segment used to construct a pipe carcass in accordance with embodiments hereof.

FIG. 1 shows an example hoop segment 110. The hoop segment 110 has a double-convex design in which outer annular surfaces 120 at the ends of the hoop segment 110 slope outwardly with a convex shape.

Figure 2:
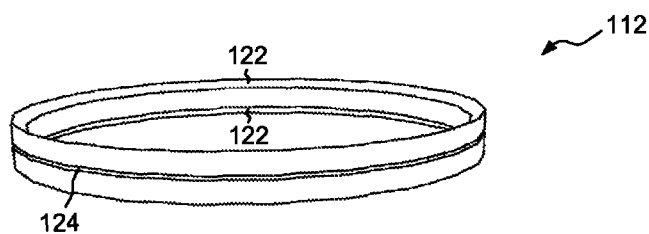
FIG. 2 is a perspective view of an example double-concave hoop segment used to construct a pipe carcass in accordance with embodiments hereof.

FIG. 2 shows an example hoop segment 112. The hoop segment 112 has a double-concave design in which outer annular surfaces 122 at the ends of the hoop segments 112 slope inwardly with a concave shape. When one of the hoop segments 110 is placed end-to-end with one of the hoop segments 112, a spherical bearing is formed between the two hoop segments. In particular, a surface 120 on the hoop segment 110 makes slidable contact with a surface 122 on the hoop segment 112. The slidable contact between the bearing surfaces 120 and 122 allows the hoop segments 110 and 112 to articulate relative to one another.

The double-concave hoop segments 112 can each be seen to include a groove 124 formed circumferentially around an outer surface thereof. The groove 124 is preferably located at about the midpoint of the segment and extends completely around. Alternatively, grooves 124 may be formed around the outsides of the double-convex hoop segments 110. Grooves may also be formed around both the double-convex hoop segments 110 and the double-concave hoop segments 112.

Figure 3:
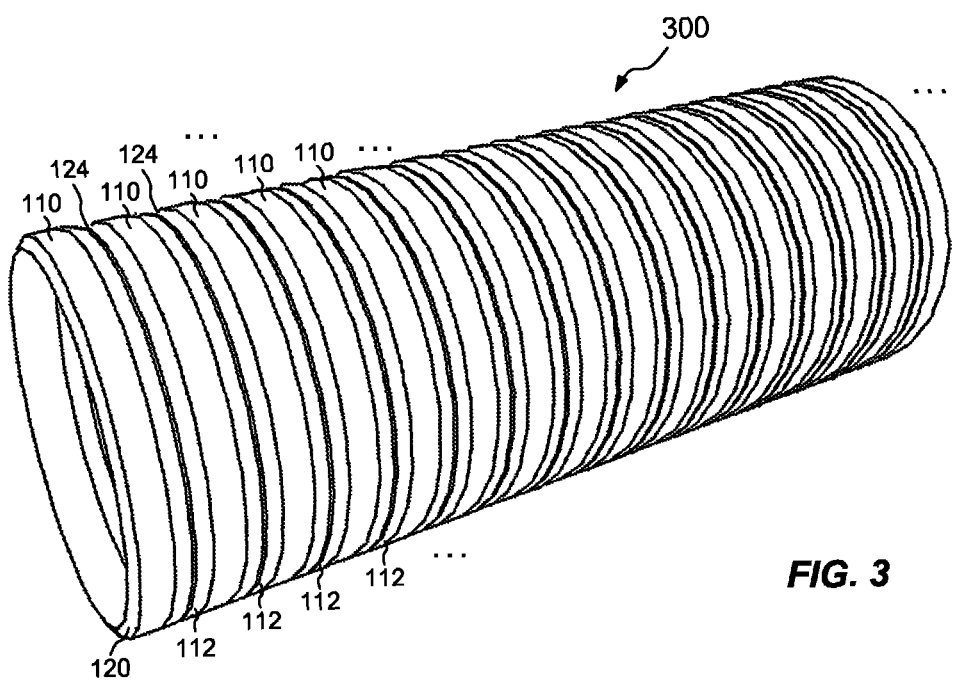
FIG. 3 is a perspective view of an example pipe carcass formed from an alternating arrangement of double-convex hoop segments, as shown in FIG. 1, and double-concave hoop segments, as shown in FIG. 2, wherein an articulating joint is formed at each junction.

FIG. 3 shows multiple hoop segments 110 and 112 arranged end-to-end in an alternating pattern to produce a pipe carcass 300. In this arrangement, each junction of a hoop segment 110 with a hoop segment 112 forms a spherical bearing. The pipe carcass thus has the ability to bend and turn as needed. As will be described, the grooves 124 are used to form nodes for anchoring a resin-impregnated outer sleeve to the carcass 300 and to hold together the hoop segments 110 and 112.

The hoops 110 and 112 are reinforced with fiber. In some examples, the fiber includes carbon fiber. The grade of carbon fiber may be varied to suit the pressure (e.g., depth) at which the carcass 300 is designed to be operated. For example, low modulus (garden variety) carbon fiber may be used for shallow applications, intermediate modulus carbon fiber may be used for greater depths, and high modulus carbon fiber may be used for deep water applications. The radial thickness of the hoops 110 and 112 may also be varied based on expected operating pressures, with thicker walls being provided for greater depths. In some examples, a single pipe is constructed with different grades of carbon fiber and different wall thicknesses, with the grade and the thickness increasing for different sections of pipe as the expected operating depths of those sections increases. For very deep water applications, boron fiber may be used in place of or in addition to carbon fiber. In some examples, boron fiber constitutes approximately 10% of the total fiber content, with carbon fiber constituting the balance of the fiber content.

To provide the requisite compressive strength to resist extremely high water pressures, the fibers in the hoops 110 and 112 are oriented predominantly circumferentially, e.g., at an angle of approximately 85 to 89 degrees. In an example, approximately 75-80% of fibers are oriented circumferentially; however, other percentages may also prove effective. The remaining fibers are oriented in different directions, with some fibers running axially and others running in a crisscross manner, e.g., at various angles between 0 and 60 degrees.

In an example, the hoops 110 and 112 are manufactured by applying a tube to a mandrel and applying the fiber to the tube. The outer diameter of the tube establishes an inner diameter of the hoops 110 and 112. The tube is wound with fiber until the outer diameter of the wound fiber meets or exceeds a desired wall thickness of the hoops 110 and 112, and the fibers are impregnated with resin. In an example, the resin is a thermoplastic or thermoset resin. Once the resin cures, the tube is removed from the mandrel. Lengths of the tube are cut off and machined to form the hoops 110 and 112, with curved surfaces 120 and 122 and grooves 124 provided as shown.

FIGS. 4-9 show the construction of an example shell around the pipe carcass 300. As will be shown and described, the shell holds the hoop segments of the pipe carcass 300 together and anchors to the pipe carcass 300 at intervals along its length.

Figure 4:
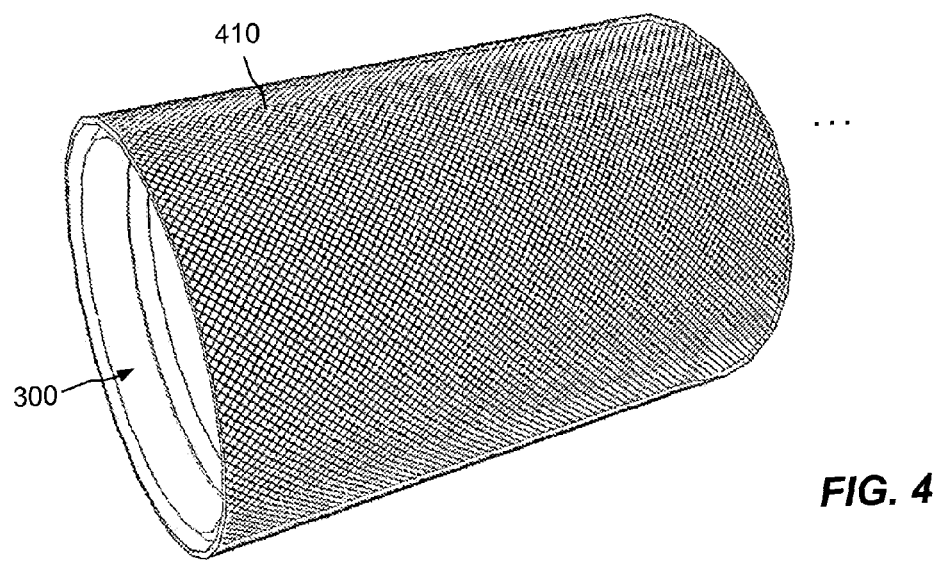
FIG. 4 is a perspective view of the example pipe structure of FIG. 3 after an inner sleeve has been applied over the pipe carcass.

FIG. 4 shows the example carcass 300 after an inner sleeve 410 has been applied. The inner sleeve 410 fits over the carcass 300 like a sock, for example. The inner sleeve 410 is preferably made of a high strength, abrasion-resistant material, such as DuPont® Kevlar™ (poly-paraphenylene terephthalamide), some other aramid fiber, or some other strong and/or synthetic fiber or combination of fibers. In an example, the fibers are braided to form a flexible sheath. For example, the hoops 110 and 112 of the carcass 300 are lined up on a mandrel and run through a braiding machine. A braid angle is selected for the fiber, which allows the carcass 300 to flex while still providing the needed tensile strength. In an example, the fibers are made of Kevlar and are braided at an angle between 50 and 55-degrees and at 2.7 m/kg (4.09 ft/lb). The inner sleeve 410 may thus be braided in situ directly onto the carcass 300, ensuring a closely matching fit.

Figure 5:
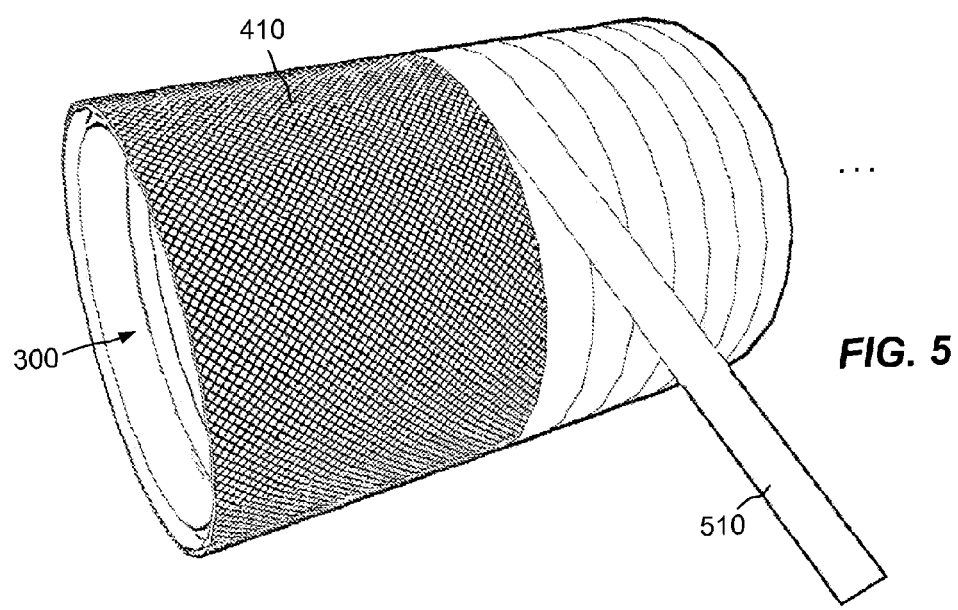
FIG. 5 is a perspective view of the example pipe structure of FIG. 4, wherein an example liquid impermeable barrier is being applied over the inner sleeve.

FIG. 5 shows tape 510 being applied to the carcass 300 over the inner sleeve 410. In an example, the tape 510 is thermoplastic silicone flash tape, which provides a liquid impermeable barrier to prevent a later-applied resin from seeping to the inner sleeve 410 and restricting its flexibility. In an example, the tape 510 is applied in an overlapping manner, e.g., in two passes so as to provide 100% overlap.

Figure 6:
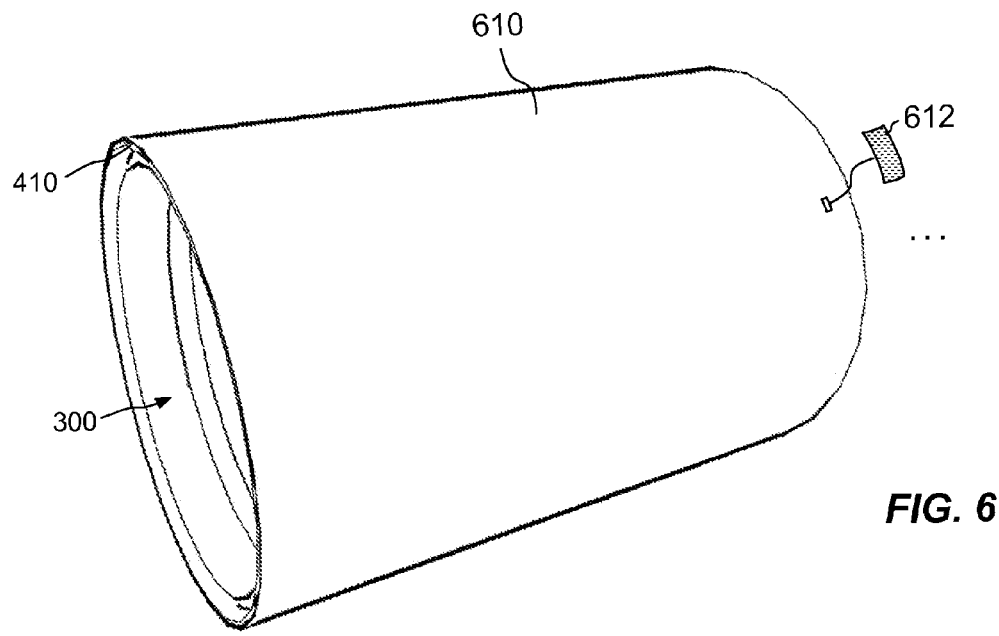
FIG. 6 is a perspective view of the example pipe structure of FIG. 5, after an example outer sleeve has been applied over the liquid impermeable barrier; once applied, the outer sleeve may be impregnated with resin.

FIG. 6 shows an outer sleeve 610, which has been applied to the carcass 300 over the tape 510. As shown in the expanded region 612 and by way of example, the outer sleeve 610 is made of fiberglass, e.g., X22L800R, +/−45-degree weave at 1.9 m/kg (2.84 ft/lb). Multiple layers of fiberglass (e.g., two layers) may be applied. In an example, the outer sleeve 610 is applied braided in situ using a braiding machine, in a manner similar to that described above for the inner sleeve 410. Next, the outer sleeve 610 is impregnated with flexible resin. In an example, the resin is selected such that it provides approximately 4% flexibility to allow the carcass 300 to bend with a radius equal to approximately 50 times its diameter. In an example, the structure is mounted to a mandrel and the outer sleeve 610 is wet out with resin, such as West Epoxy 105/209, for example.

Figure 7:
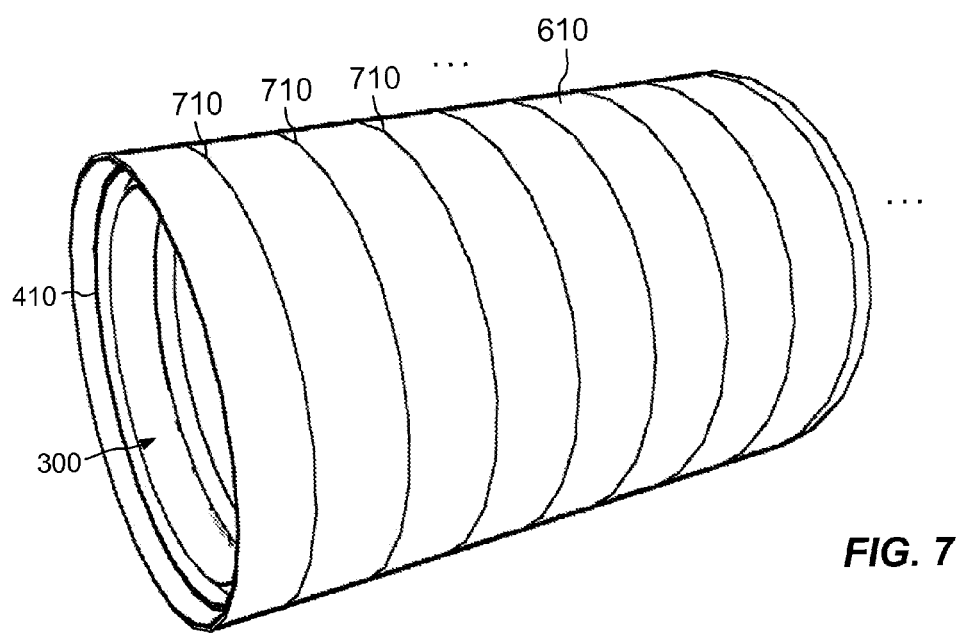
FIG. 7 is a perspective view of the example pipe structure of FIG. 6, after fiber has been wound around the outer sleeve, with windings concentrated over grooves in the double-concave hoop segments to form nodes where the outer sleeve becomes anchored to the pipe carcass.

FIG. 7 shows the same arrangement as in FIG. 6, but here a fiber 710 has been wound around the resin-impregnated outer sleeve 610 with windings concentrated over the grooves 124 in the hoop segments 112. The fiber 710 may be a high-strength fiber (e.g., fiberglass, carbon, aramid, etc.) or a low modulus fiber, for example, and is applied prior the resin curing. Preferably, multiple wraps of fiber 710 are applied at a high angle effectively to lock down the outer sleeve 610 into the grooves 124. In an example, the fiber 710 is composed of a single end of 225 lypp fiberglass roving, which is built up between 4-5 wraps in each groove 124.

Figure 8:
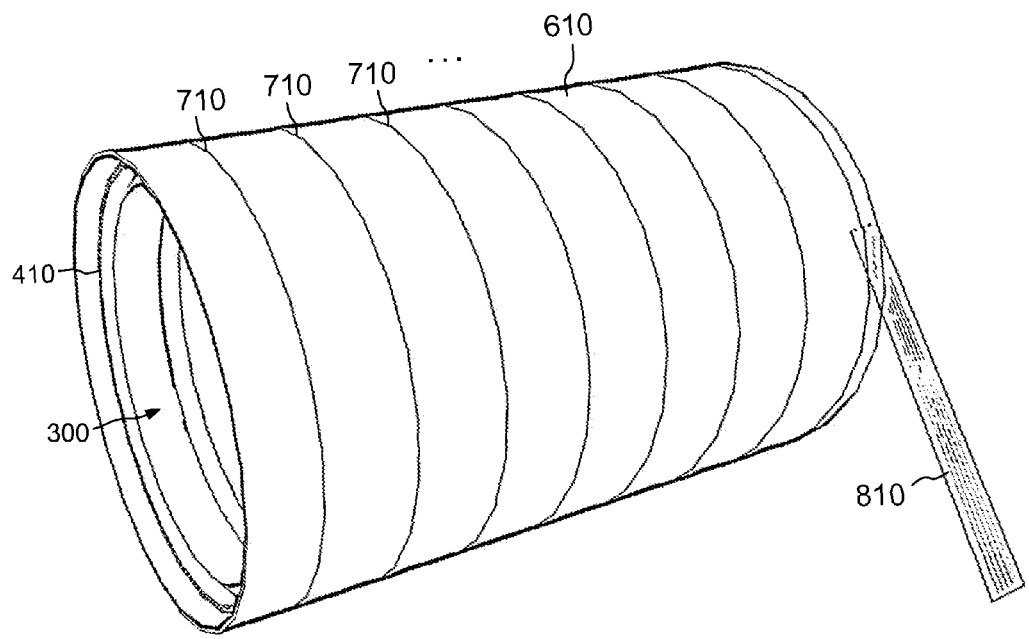
FIG. 8 is a perspective view of an example heat-shrinkable material being applied over the outer sleeve over the wound fiber.

FIG. 8 shows the same arrangement as in FIG. 7, but here a layer of heat shrinkable tape 810 is being applied to the outside of the resin-impregnated outer sleeve 610 and fiber 710. Once applied, the tape 810 may be heated to activate shrinkage. The resin is allowed to cure in this condition.

Figure 9:
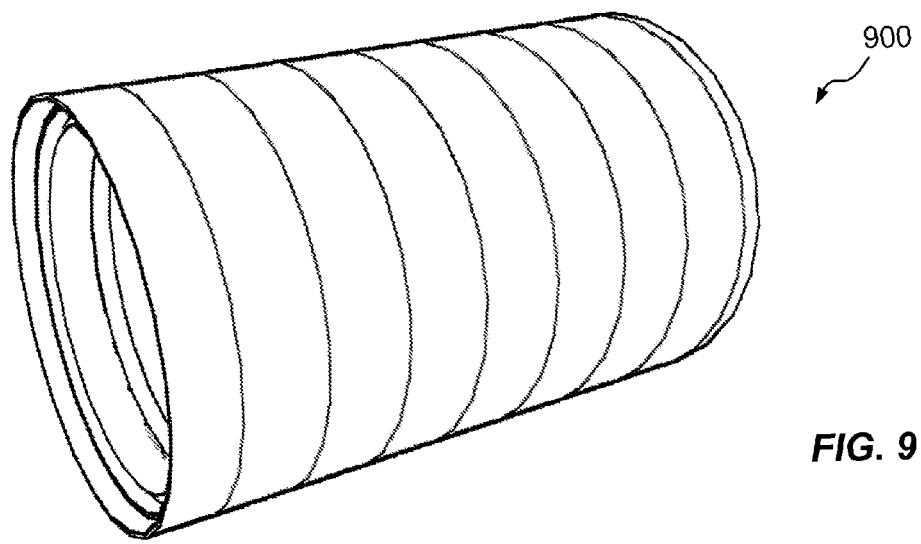
FIG. 9 is a perspective view of an example finished pipe structure.

FIG. 9 shows the completed pipe structure 900 after the resin has cured and the tape 810 has been removed to reveal a smooth surface. Additional layers may be provided to the pipe structure 900, as desired to suit the target application.

The resulting pipe structure 900 is flexible yet strong enough to withstand the high pressures required for deep water applications. Unlike pipe structures made of steel carcasses, the pipe structure 900 does not corrode, nor does it suffer from metal fatigue. The pipe structure 900 is thus expected to provide a long service life. The pipe structure 900 is also lightweight as compared with steel-based designs and is thus easier to handle and transport.

Figure 10:
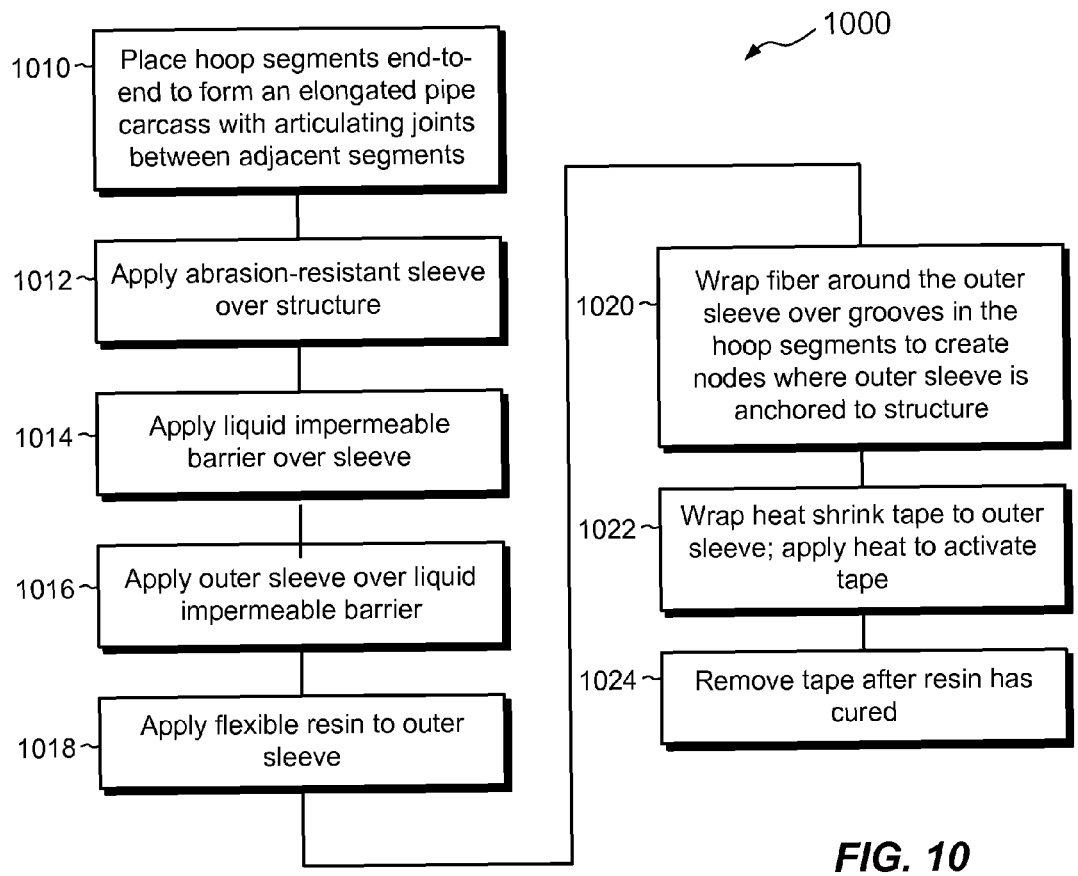
FIG. 10 is a flowchart showing an example process for manufacturing a pipe structure in accordance with embodiments hereof.

FIG. 10 shows an example process 1000 for manufacturing the pipe structure 900. It is understood that the order of the acts of the process 1000 may be varied, with some acts performed in orders different from that shown and/or with some acts performed simultaneously. The particular order of the acts as shown should thus be regarded as merely illustrative.

At 1010, hoop segments are placed end-to-end to form an elongated pipe carcass having articulating joints between adjacent segments. For example, double-convex hoop segments 110 (FIG. 1) are placed in an alternating pattern with double-concave hoop segments 112 (FIG. 2) to form the pipe carcass 300 (FIG. 3). Each double-convex hoop segment 110 forms a spherical bearing with each of its neighboring double-concave hoop segments 112. Likewise, each double-concave hoop segment 112 forms a spherical bearing with each of its neighboring double-convex hoop segments 110.

At 1012, an abrasion-resistant sleeve may be applied over the structure. For example, the inner sleeve 410 (FIG. 4) may be braided in situ over the pipe carcass 300. It should be understood that some embodiments do not require an inner sleeve 410; thus, whether the act 1012 is performed should be viewed a matter of design choice.

At 1014, a liquid impermeable barrier is applied over the inner sleeve. For example, tape 510 (FIG. 5) is wound around the pipe structure over the inner sleeve 410.

At 1016, an outer sleeve is applied over the liquid impermeable barrier. For example, outer sleeve 610 is braided in situ onto the pipe structure, i.e., over the liquid impermeable barrier formed by the tape 510.

At 1018, resin is applied to the outer sleeve. For example, a thermoplastic or thermoset resin is applied to the outer sleeve 610. The resin has some ability to flex once cured.

At 1020, fiber is wrapped around the outer sleeve over grooves in the hoop segments to create nodes where the outer sleeve is anchored to the structure. For example, fiber 710 (FIG. 7) is wound around the outer sleeve 610, with windings concentrated in regions outside the grooves 124 (FIGS. 2 and 3) effectively to press the regions of the resin-impregnated outer sleeve 610 into the grooves 124. Alternatively, fiber 710 may be wrapped prior to applying the resin, although better penetration of resin near the grooves 124 may typically be achieved when applying the resin before wrapping the fiber 710. When the resin cures, the hardened outer sleeve 610 forms nodes that hold together the hoop segments 110 and 112 of the carcass 300 while providing flexibility. It should be understood that fiber 710 need not be concentrated around every groove 124 in the pipe carcass 300 to form an anchor. Depending on design requirements, fiber 710 may be applied over only some grooves. Also, although the fiber 710 is applied at intervals along the length of the carcass 300, there is no need for such intervals to be uniform. The particular placement of nodes is rather a matter of design choice.

At 1022, heat shrink tape is wrapped around the outer sleeve and heat is applied to activate the tape. For example, heat shrink tape 810 (FIG. 8) is wrapped over the resin-impregnated outer sheath 610 prior to the resin curing. The tape 810 contracts when heated, helping to promote smoothness and uniformity.

At 1024, the heat shrink tape is removed after the resin has cured, revealing a finished pipe structure (e.g., 900) having a smooth and even surface.

It should be understood that 1022 and 1024 are only helpful if the pipe structure 900 is desired to be smooth. Otherwise, acts 1022 and 1024 may be omitted. Removing the tape (act 1024) may be optional even when a smooth surface is desired.

An improved pipe structure has been described, which includes a pipe carcass 300 made from an arrangement of hoop segments 110 and 112 that join to form a series of articulating joints. A hard yet flexible outer shell (e.g., 610) is formed around the carcass 300. The shell 610 anchors to the carcass 300 at intervals along its length to hold the hoop segments 110 and 112 together while providing the flexibility needed for deep water applications. The hoop segments 110 and 112 are reinforced with fiber (e.g., carbon fiber, boron fiber, etc.), which resist fatigue and corrosion and affords the pipe structure a much higher strength-to-weight ratio than can be achieved with conventional steel carcasses. The pipe structure is lightweight, and the articulating joints between segments and outer shell allow the structure to flex.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Having described certain embodiments, numerous alternative embodiments or variations can be made. For example, although the hoop segments 110 have been shown and described as double-convex and the hoop segments 112 have been shown and described as double-concave, this is merely an example. Alternatively, for example, a single type of hoop segment may be provided, which has a concave surface on one side and a convex surface on the other.

Figure 11:
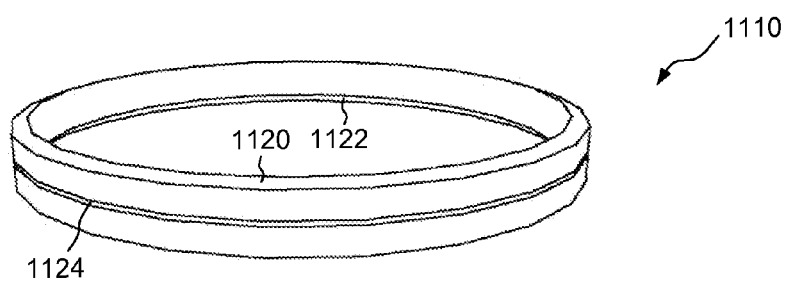
FIG. 11 is a perspective view of an example concave-convex hoop segment that may be used to construct an alternative pipe carcass in accordance with embodiments hereof.

FIG. 11 shows an example concave-convex hoop segment 1110. The hoop segment 1110 has a convex annular bearing surface 1120 at one end and a concave annular bearing surface 1122 at the other end. The hoop segment 1110 may include a groove 1124 for anchoring to an outer shell, in a manner similar to that described above for the groove 124. Multiple hoop segments 1110 may be arranged end-to-end to form an alternative pipe carcass (not shown), which requires only a single type of hoop segment. Each hoop segment 1110 forms a spherical bearing with each of its neighbors.

Also, while it has been shown that grooves 124 are used to anchor the resin-impregnated outer sleeve 610 to the carcass 300, other features besides grooves 124 may be provided. For example, the hoop segments, or some sub-set of them, may include raised ridges (bumps, not shown) that run around the circumference of the hoop segments. Fiber 710 may be wound so as to anchor the outer sleeve 610 on one side (or both sides) of the bumps. As a variant on this idea, pairs of raised ridges may be provided around the hoop segments, with the indentations formed between the raised ridges serving as anchor points.

Also, while the carcass 300 and resulting pipe structures have been described for use in deep water applications, they are also well suited for other high pressure applications.

Further, although the hoop segments 110, 112, and 1110 have been shown and described as including carbon fiber and/or boron fiber, these are merely examples. Alternatively, the fiber in the hoop segments may be composed of some other high strength fiber or combination of fibers.

Further, although the hoop segments 110, 112, and 1110 have been shown and described as forming joints that function as spherical bearings, this is merely an example. Different bearing types may be better suited for particular applications. Thus, the joints formed between adjacent hoop segments may provide other types of bearings, such as hinge bearings, gliding bearings, pivot bearings, saddle bearings, and condyloid bearings, for example.

Further, as shown and described, the inner sleeve 410 and the outer sleeve 610 are braided onto the carcass 300 in situ, e.g., the carcass 300 is loaded onto a mandrel and advanced through a braider or similar machine as fiber is braided onto the carcass 300. This is merely an example, however. Alternatively, the inner sleeve 410 and/or the outer sleeve 610 may be prefabricated and applied over the carcass 300 during manufacturing. Although braided designs are particularly well suited for the carcass 300, the inner sleeve 410 and/or outer sleeve 610 may be formed using a non-braided design, such as by using other types of woven fabrics, unidirectional fibers, by using sheets or tape, and/or by using other pliable materials, for example.

Further, although the structure 900 is seen to have a shell including both an inner sleeve 410 and an outer sleeve 610, this also is merely an example. For instance, the inner sleeve 410 may be omitted from the shell in some applications. The liquid impermeable barrier formed by the tape 510 may be applied directly to the carcass 300 and the outer sleeve 610 may be applied over the tape 510. According to this variant, the sleeve 610 may be composed of an abrasion-resistant material, such as Kevlar or some other aramid fiber, for example.

Further still, although features are shown and described with reference to particular embodiments hereof, such features may be included in any of the disclosed embodiments and their variants. Thus, it is understood that features disclosed in connection with any embodiment can be included in any other embodiment, whether such inclusion is made explicit herein or not.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A pipe structure for use in high-pressure environments, the pipe structure comprising:
    multiple hoop segments, the hoop segments arranged end-to-end to form a pipe carcass having an articulating joint between each pair of adjacent hoop segments; and
    a shell disposed around the pipe carcass, the shell having multiple raised features projecting internally, each raised feature of the shell including a continuous, circumferential winding of fiber embedded in the shell, the raised features engaging anchoring features formed in outer surfaces of a plurality of the hoop segments to anchor the shell to the pipe carcass at intervals along a length thereof.

2. The pipe structure of claim 1, wherein each of the hoop segments includes a first bearing surface at a first end of the respective hoop segment and a second bearing surface at a second end of the respective hoop segment.

3. The pipe structure of claim 2, wherein the first bearing surface has an annular shape and a spherical curvature, and wherein the second bearing surface has an annular shape and a spherical curvature.

4. The pipe structure of claim 3,
    wherein the hoop segments include first hoop segments and second hoop segments arranged in an alternating pattern along the length of the pipe carcass,
    wherein, for each of the first hoop segments, the first bearing surface is concave and the second bearing surface is concave,
    wherein, for each of the second hoop segments, the first bearing surface is convex and the second bearing surface is convex, and
    wherein one of the first hoop segments forms (i) a first spherical bearing with one of the second hoop segments and (ii) a second spherical bearing with another of the second hoop segments.

5. The pipe structure of claim 3,
    wherein, for each of the hoop segments, the first bearing surface is concave and the second bearing surface is convex, and
    wherein a first of the hoop segments forms (i) a first spherical bearing with a second of the hoop segments and (ii) a second spherical bearing with a third of the hoop segments.

6. The pipe structure of claim 1, wherein each of the hoop segments is individually reinforced with fiber such that the fiber contributes to each hoop segment's respective structural strength.

7. The pipe structure of claim 1, wherein each of the anchoring features includes a circumferential groove around an outer surface of the respective hoop segment, and wherein the continuous, circumferential winding of fiber embedded in the shell includes fiber wrapped in a vicinity of the circumferential groove to press the shell into the groove and thereby to anchor the shell to the pipe carcass.

8. The pipe structure of claim 7, wherein the shell includes:
    a liquid impermeable barrier disposed around the pipe carcass; and
    an outer sleeve disposed around the liquid impermeable barrier,
    wherein the outer sleeve is impregnated with resin that has an ability to flex when cured.

9. The pipe structure of claim 8, wherein the shell further includes an inner sleeve made from an abrasion-resistant material and disposed between the pipe carcass and the liquid impermeable barrier.

10. The pipe structure of claim 9, wherein the inner sleeve includes a braided aramid fiber and the outer sleeve includes braided fiberglass.

11. The pipe structure of claim 1, wherein each of the multiple hoop segments is individually reinforced with fiber, and wherein a majority of the fiber in each of the hoop segments is oriented circumferentially.

12. The pipe structure of claim 11, wherein at least some of the hoop segments include a combination of carbon fiber and boron fiber.

13. A method of manufacturing a pipe structure for use in high-pressure environments, the method comprising:
    arranging multiple hoop segments end-to-end to form a pipe carcass having an articulating joint between each pair of adjacent hoop segments;
    applying a shell around the pipe carcass; and
    anchoring the shell to the pipe carcass at intervals along a length of the pipe carcass,
    wherein applying the shell includes:
        applying a liquid-impermeable barrier around the pipe carcass;
        applying a sleeve around the liquid-impermeable barrier; and
        applying resin to the sleeve, the resin having an ability to flex when cured,
    wherein at least some of the hoop segments include a circumferential groove, and
    wherein anchoring the shell to the pipe carcass includes (i) pressing regions of the sleeve outside respective grooves into the grooves prior to the resin curing and (ii) allowing the resin to cure with the regions of the sleeve pressed into the respective grooves.

14. The method of claim 13, wherein arranging the hoop segments forms an articulating bearing between each hoop segment and each of its adjacent hoop segments.

15. The method of claim 14, wherein pressing the regions of the sleeve into the respective grooves includes winding fiber around the sleeve and concentrating the winding in the regions of the sleeve outside the grooves.

16. The method of claim 14, further comprising, prior to applying the liquid-impermeable barrier, applying an inner sleeve around the pipe carcass, wherein the inner sleeve includes fibers, and wherein applying the inner sleeve includes braiding the fibers of the inner sleeve onto the pipe structure in situ.

17. The method of claim 16, wherein the sleeve includes fibers, and wherein applying the sleeve includes braiding the fibers of the sleeve onto the pipe structure in situ.

18. The method of claim 14, further comprising manufacturing the hoop segments by winding fiber onto a tube such that a majority of the fiber is oriented circumferentially with a remaining portion of the fiber oriented at various other angles.

19. The method of claim 18, wherein manufacturing the hoop segments further includes establishing a wall thickness of hoop segments based upon an intended operating pressure of the pipe structure, and wherein winding the fiber onto the tube is conducted until a thickness of the fiber wound onto the tube is at least as large as the established wall thickness.

20. The method of claim 18, wherein the fiber includes carbon fiber, wherein manufacturing the hoop segments further includes selecting a modulus of carbon fiber based upon an intended operating pressure of the pipe structure, and wherein winding the fiber onto the tube includes winding carbon fiber of the selected modules onto the tube.

21. A pipe structure for use in high-pressure environments, the pipe structure comprising:
- multiple first hoop segments, each of the first hoop segments, having an annular shape and having a concave spherical bearing surface at each end thereof;
- multiple second hoop segments, each of the second hoop segments including carbon fiber, having an annular shape, and having a convex spherical bearing surface at each end thereof;
- the first hoop segments and the second hoop segments arranged in an alternating pattern end-to-end to form a pipe carcass such that each of the first hoop segments forms a spherical bearing with each second hoop segment adjacent thereto; and
- a shell disposed around the pipe carcass, the shell having multiple raised features projecting internally, each raised feature of the shell including a continuous, circumferential winding of fiber embedded in the shell, the raised features engaging anchoring features formed in outer surfaces of a plurality of the hoop segments to anchor to the pipe carcass at intervals along its length.

* * * * *